United States Patent
Costa et al.

(10) Patent No.: US 12,255,916 B2
(45) Date of Patent: Mar. 18, 2025

(54) REAL-TIME DETECTION OF ONLINE NEW-ACCOUNT CREATION FRAUD USING GRAPH-BASED NEURAL NETWORK MODELING

(71) Applicant: Akamai Technologies, Inc., Cambridge, MA (US)

(72) Inventors: Nadav George Costa, Ramat Gan (IL); Ziv Eli, Tel Aviv (IL)

(73) Assignee: Akamai Technologies, Inc., Cambridge, MA (US)

( * ) Notice: Subject to any disclaimer, the term of this patent is extended or adjusted under 35 U.S.C. 154(b) by 281 days.

(21) Appl. No.: 17/862,460

(22) Filed: Jul. 12, 2022

(65) Prior Publication Data
US 2024/0022593 A1    Jan. 18, 2024

(51) Int. Cl.
*H04L 9/40*    (2022.01)
*H04L 41/16*    (2022.01)

(52) U.S. Cl.
CPC .......... *H04L 63/1441* (2013.01); *H04L 41/16* (2013.01); *H04L 63/102* (2013.01)

(58) Field of Classification Search
CPC .... H04L 63/1441; H04L 63/102; H04L 41/16
See application file for complete search history.

(56) References Cited

U.S. PATENT DOCUMENTS

| | | | |
|---|---|---|---|
| 11,570,203 B2 | 1/2023 | Summers et al. | |
| 2007/0288759 A1 | 12/2007 | Wood et al. | |
| 2016/0364794 A1 | 12/2016 | Chari et al. | |
| 2020/0364366 A1* | 11/2020 | Kundu | H04L 63/102 |
| 2021/0218760 A1 | 7/2021 | Lee et al. | |
| 2022/0360596 A1* | 11/2022 | Varnavas | G06F 21/50 |

FOREIGN PATENT DOCUMENTS

| | | |
|---|---|---|
| CN | 114372803 A | 4/2022 |
| CN | 114511314 A | 5/2022 |

OTHER PUBLICATIONS

PCT/US2023/027465, International Search Report and Written Opinion, mailed Nov. 7, 2023.
Zhou, et al., "Graph neural networks: A review of methods and applications," AI Open, vol. 1, 2020, pp. 57-81.
Menzli, "Graph Neural Network and Some of GNN Applications: Everything You Need to Know," Neptune Blog, Sep. 11, 2023,.

* cited by examiner

*Primary Examiner* — Thaddeus J Plecha
(74) *Attorney, Agent, or Firm* — David H. Judson

(57) ABSTRACT

A method executes upon receiving data (email, IP address) associated with an account registration. In response, an encoding is applied to the data to generate a node vector. The node vector indexes a database of such node vectors that the system maintains (from prior registrations). The database potentially includes one or more node vector(s) that may have a given similarity to the encoded node vector. To determine whether there are such vectors present, a set of k-nearest neighbors to the encoded node vector are then obtained from the database. This set of k-nearest neighbors together with the encoded node vector comprise a virtual graph that is then fed as a graph input to a Graph Neural Network previously trained on a set of training data. The GNN generates a probability that the virtual graph represents a NAF. If the probability exceeds a configurable threshold, the system outputs an indication that the registration is potentially fraudulent, and a mitigation action is taken.

20 Claims, 13 Drawing Sheets

REAL-TIME DETECTION OF ONLINE NEW-ACCOUNT CREATION FRAUD USING GRAPH-BASED NEURAL NETWORK MODELING

BACKGROUND

Technical Field

This application relates generally to network security and, in particular, to techniques that detect and prevent new account fraud (NAF).

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Account takeover on the Internet is a significant problem, resulting is significant losses. There are known technologies and services that address this problem. For example, and in the CDN space, Akamai® Bot Manager helps mitigate bot-driven credential abuse and account takeover attempts. Solutions of this type have also been extended to enable service customers to fight against both automated and human fraud attacks related to account takeover (ATO) and new account fraud (NAF). ATO refers to an attack by which a malicious actor gains access to a victim's account at a web site or application. ATO is frequently accomplished via credential stuffing attacks, whereby credentials from previous user database breaches are tried in an iterative fashion against one or more web sites. Successful ATO leads to a compromised account. NAF is an attack by which a malicious actor creates an account at a web site or application by claiming to be a person other than their true identity. These may be the result of identity theft, using a real person's identity to create a new account without their knowledge. This may also be a synthetic identity, e.g., created using a collection of attributes including name, address, phone number, and email address, where the combination does not truly represent a real person. The purpose of NAF is typically to gain benefits of a new account, such as a free trial period, coupons, discounts, loyalty points, miles, and rewards. These benefits are then combined and resold to others who cash out by redeeming those points, miles, or for items of value.

The most common NAF scenario arises during registrations in which email addresses are required. As noted above, when creating a new account, the user is often required to deliver several identifying fields, such as username, password, and an active email address. Often, when a user's intentions are fraudulent, the applied signals will generally tend to be obscured to mask the user's real identity. Also, and to maximize personal gain, the fraudster may create many new accounts. Indeed, by focusing on email-based signals, the user has many ways to create fake and/or temporary email address(es) that will serve his or her attack.

A graph neural network (GNN) is a class of neural network for processing data of graph structures. In computer science, a graph is an abstract data type that implements so-called undirected or directed graphs (as those terms are known from the field of graph theory within mathematics). An abstract data type (ADT) is a mathematical model for data types. A graph data structure consists of a finite (and possibly mutable) set of vertices (also called nodes or points), together with a set of unordered pairs of these vertices for an undirected graph or a set of ordered pairs for a directed graph. These pairs are known as edges (also called links or lines), and for a directed graph are also known as arrows or arcs. The vertices may be part of the graph structure, or may be external entities represented by integer indices or references. A graph data structure may also associate to each edge some edge value, such as a symbolic label or a numeric attribute (cost, capacity, length, etc.). GNNs are a generalization to graph-structured data of convolutional neural networks, which are regularized versions of multilayer perceptrons (typically, fully-connected networks, that is, with each neuron in one layer connected to all neurons in the next layer). GNNs are applied to graphs directly to perform various types of learning tasks.

BRIEF SUMMARY

The technique herein provides for mapping new account registration logs into imposed connected graphs for detecting new account open fraud. The approach leverages the notion that when multiple fake accounts are created, similarity cues across the composing logs are identified as a graph clique. For detecting NAF, preferably a graph neural network that includes an attention mechanism is utilized.

In one embodiment, a method of protecting an online system (e.g., a website, a web application, or the like) is implemented upon receiving data associated with a new account open. Typically, the data comprises an email, and an associated Internet Protocol (IP) address. In response to receipt of the new account open (a current "query"), an encoding is applied to each of the email and IP address, with the resulting encodings concatenated into a node vector. The node vector is then applied to a database of such node vectors that the system maintains (from prior registrations). In this embodiment, and to provide fast lookup, the database is implemented in-memory to retain a given number of the most-recently seen account registrations; as additional registrations occur to the system, the oldest entries in the database continually age out. By maintaining the most recently-seen registrations, however, the database potentially includes one or more node vector(s) that may have a given similarity to the encoded node vector generated from the current query. To determine whether there are such vectors present in the database, a set of k-nearest neighbors to the encoded node vector are then obtained from the database. This set of k-nearest neighbors together with the query node comprise an input graph. This graph is sometimes referred to herein as a "virtual" graph because input data (stored node vectors) for this graph do not contain any indication of graphical structure explicitly. The virtual graph comprised of the k-nearest neighbors and query is then fed into a Graph Neural Network (GNN) that has been previously trained on a set of training data. The GNN preferably includes a self-attention output layer (with pooling) for effective attention to significant signals, and it generates a probability (between 0 and 1) that a new query represents a NAF. If the probability exceeds a configurable threshold, the system outputs an indication that the query is potentially fraudulent. This is also an indication that the query and at least some of the k-nearest neighbors constitute a fraud clique. In response to a determination that the new account open is potentially fraudulent, a mitigation action is taken to protect the online system.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
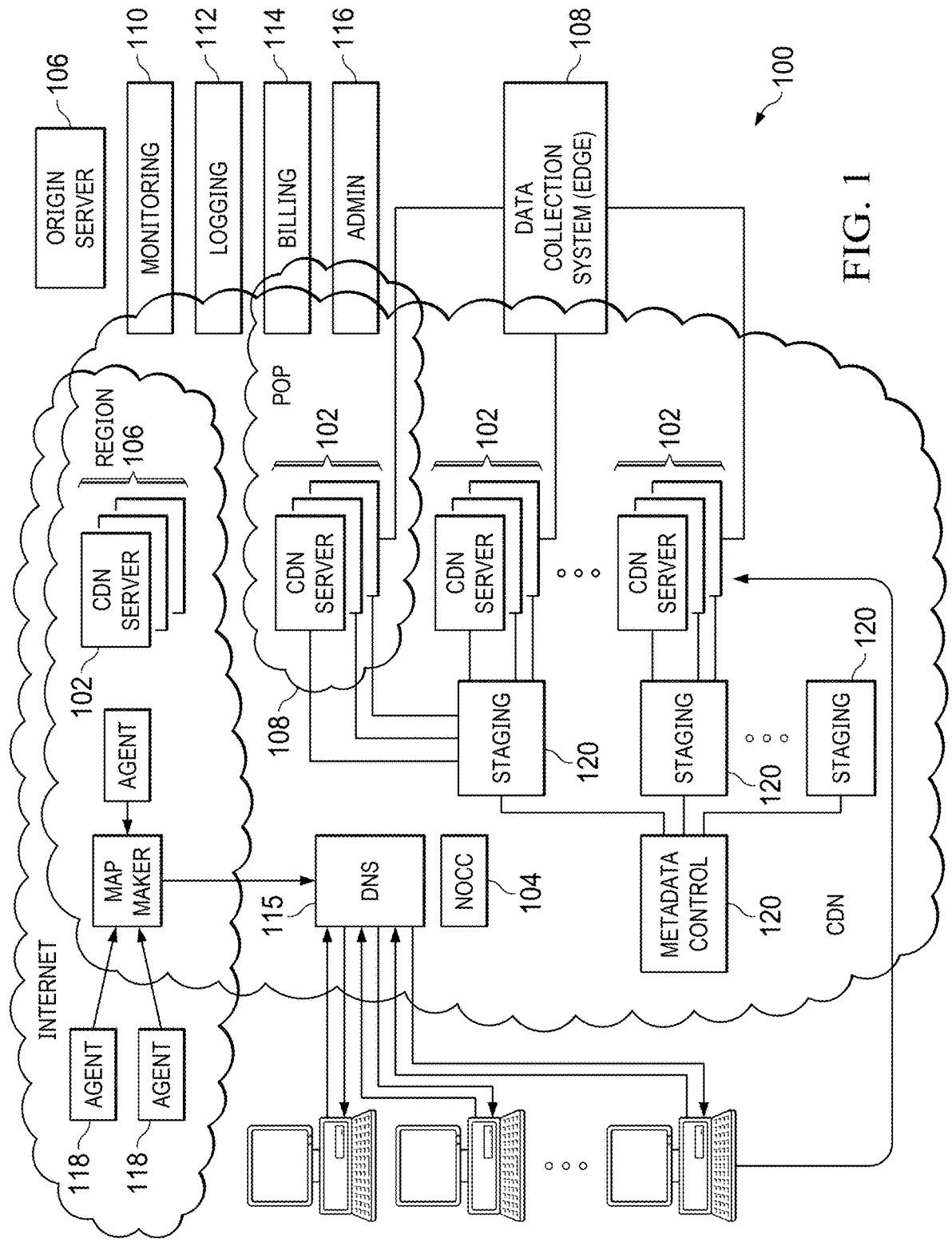
FIG. 1 is a block diagram illustrating a known distributed computer system configured as a content delivery network (CDN)

A representative online system in which real-time detection and prevention of new account fraud (NAF) is implemented according to this disclosure is depicted in FIG. 1. The system is a content delivery system. This implementation is not intended to be limited, as the techniques herein may be practiced in any type of computer system, in a standalone manner, or as a particular function of some other computer-implemented system, device, process, or the like.

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
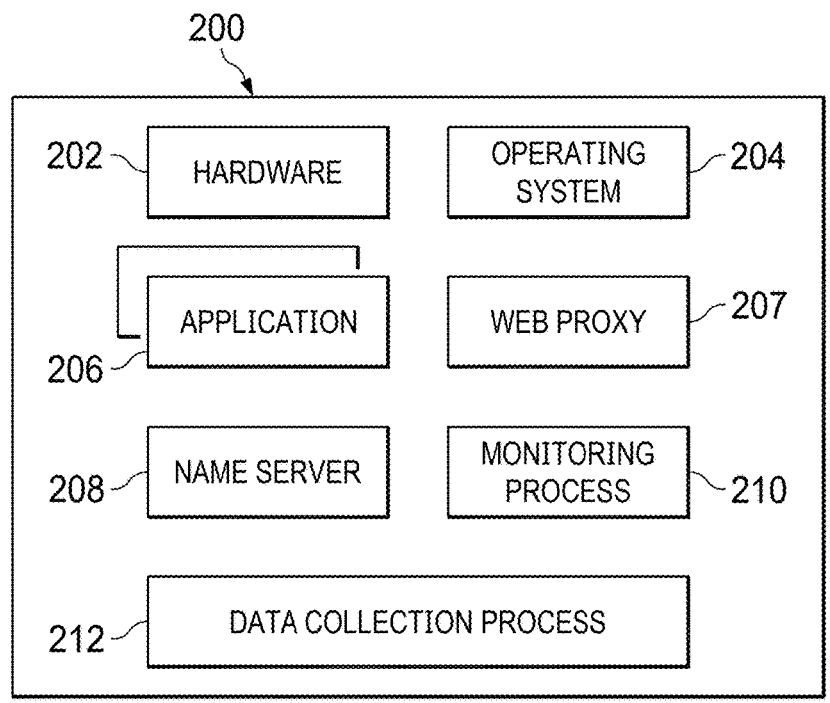
FIG. 2 is a representative CDN edge machine configuration.

As illustrated in FIG. 2, a given machine 200 comprises commodity hardware (e.g., an Intel® processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a global host process), a name server 208, a local monitoring process 210, a distributed data collection process 212, and the like. The HTTP proxy 207 or "edge server") serves web objects, streaming media, software downloads and the like. A CDN edge server is configured to provide one or more extended content delivery features, preferably on a domain-specific, customer-specific basis, preferably using configuration files that are distributed to the edge servers using a configuration system. For example, a given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Figure 3:
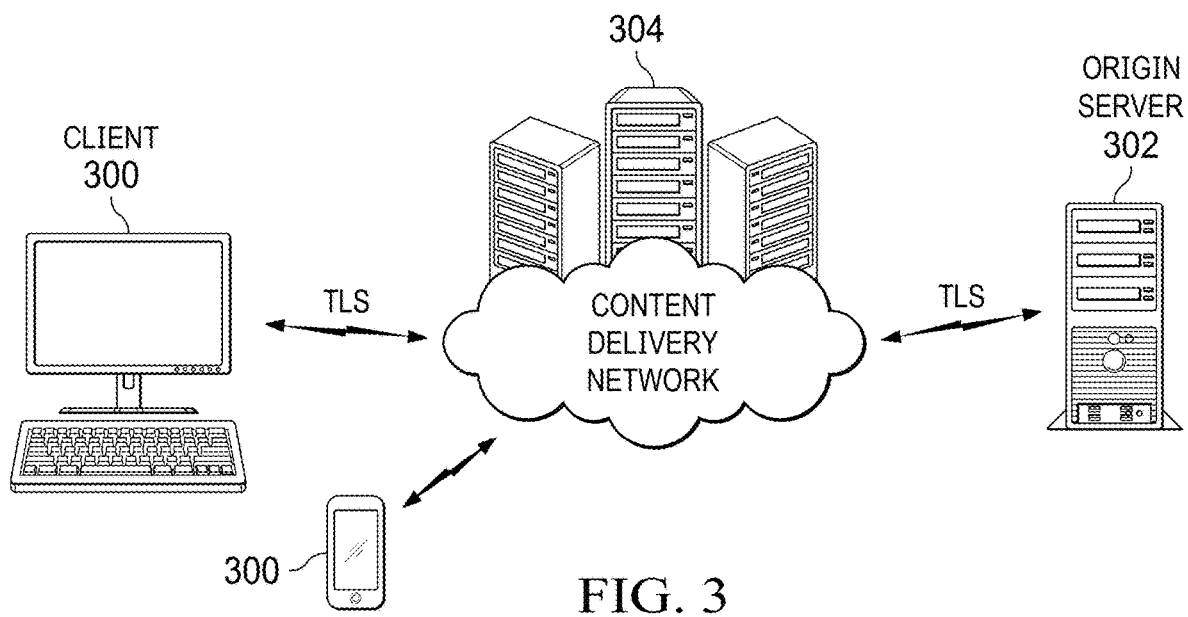
FIG. 3 depicts a representative client machine interaction with an origin server via a content delivery network.

As illustrated in FIG. 3, in the typical interaction scenario, an end user client browser or mobile app 300 is associated with a customer origin server (or "origin") 302 via the intermediary of an overlay network edge machine server instance 304 (the "edge server"). The terms "origin" or "edge" are not intended to be limiting.

A content delivery network such as described above may be augmented to provide a user recognition (sometimes referred to as "account protection") service to prevent user login or other protected endpoint request abuse, possibly in association with a bot detection system. User recognition refers to a feature that recognizes a user not necessarily (or solely) based on a provided user identifier and credentials, but also on other one or more other characteristics. To this end, and in an embodiment described in U.S. Publication No. 2021/0226987, the service collects user recognition data, preferably for each login attempt (e.g., data about the connection, session, and other relevant context), and it constructs a true user profile for each such user over time, preferably using the recognition data from successful logins. The profile may evolve as additional recognition data is collected from successful logins. As such, the true user profile is a model of what the user "looks like" to the system. For a subsequent login attempt, the system then calculates a true user score. This score represents how well the current user recognition data matches the model represented by the true user profile. Preferably, the user recognition service is used to drive different policy decisions and enforcement capabilities. Thus, e.g., for an account protection service, user recognition facilitates enforcing a policy-driven security model, e.g., as a policy decision point (PDP) that determines what action to take on an authentication attempt, and the ancillary control by a policy enforcement point (PEP) that implements a policy decision. Preferably, user recognition such as described above works in association with bot detection in a combined solution.

It is also assumed that the CDN has some basic capability to recognize an account owner and to provide an access decision based on such recognition. In particular, a system of this type has the capability to determine that it has seen a particular user previously, typically based on data that the system holds that allows such recognition, and this is so whether or not the system also knows the user's actual identity (who he or she purports to be). A representative system of this type is Akamai® Identity Cloud, which provides a secure, seamless, scalable customer identity and access management (CIAM) service. This service provides for a wide array of authentication methods, including social media login, directory services, and OpenID Connect (OIDC), role-based and attribute-based access control (RBAC and ABAC), and risk-based and multi-factor authentication options, for secure access and single sign-on (SSO) across the customer's ecosystem. Preferably, the service is cloud-native, and it is provided (in association with one or more other CDN services) as a service (namely, a SaaS) solution. As such, it is designed to intelligently scale to ensure that customer registration, authentication, and SSO functions are always available and perform with the lowest latency.

Figure 4:
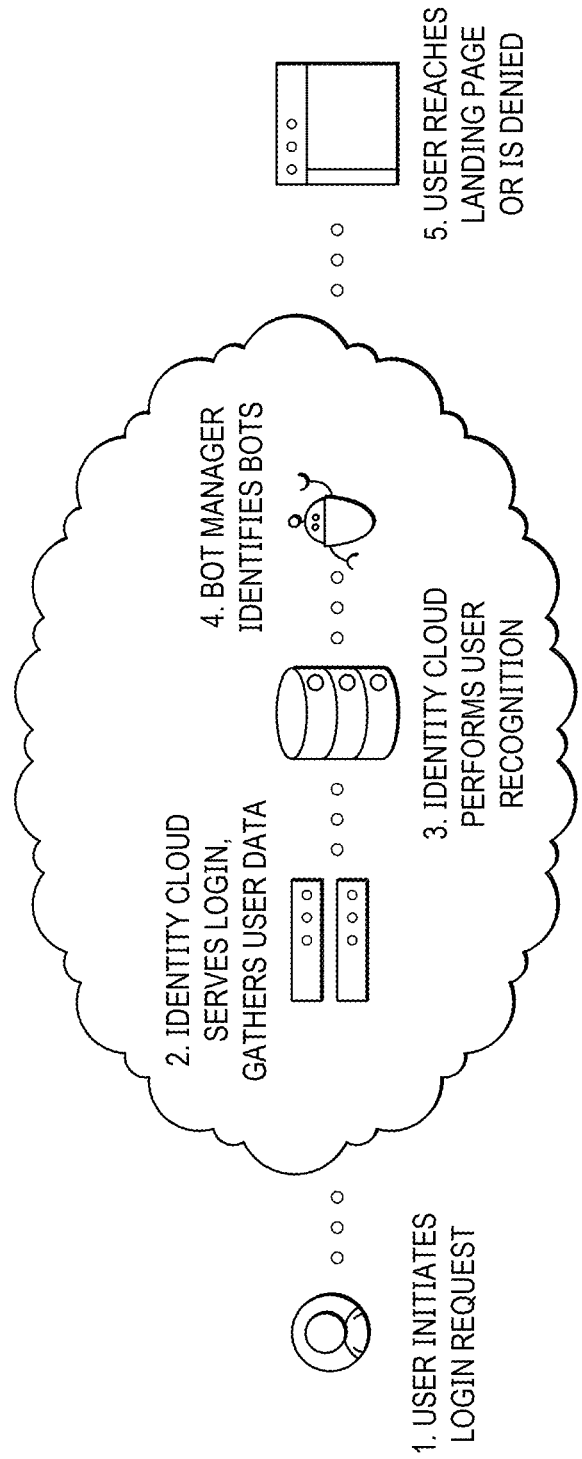
FIG. 4 is a depiction of a known user recognition service that provides for real-time detection of false users.

FIG. 4 depicts an account protection service in operation. Systems/services identified by their commercial names (e.g., Akamai® Identity Cloud) are merely exemplary and are not intended to be limiting. At step (1), the user initiates a login request. At step (2), Identity Cloud (the CIAM service) services the login, and gathers user data (as explained in more detail below). At step (3), Identity Cloud performs user recognition as provided for herein. At step (4), optionally a bot detection service identifies bots. At step (5), the user reaches the landing page (when no login fraud is detected) or is denied (when a potential login fraud is detected). According to the approach, the true user score enables the CIAM (or other) service to measure end user risk.

With the above as background, the techniques of this disclosure are now presented in detail.

Figure 5:
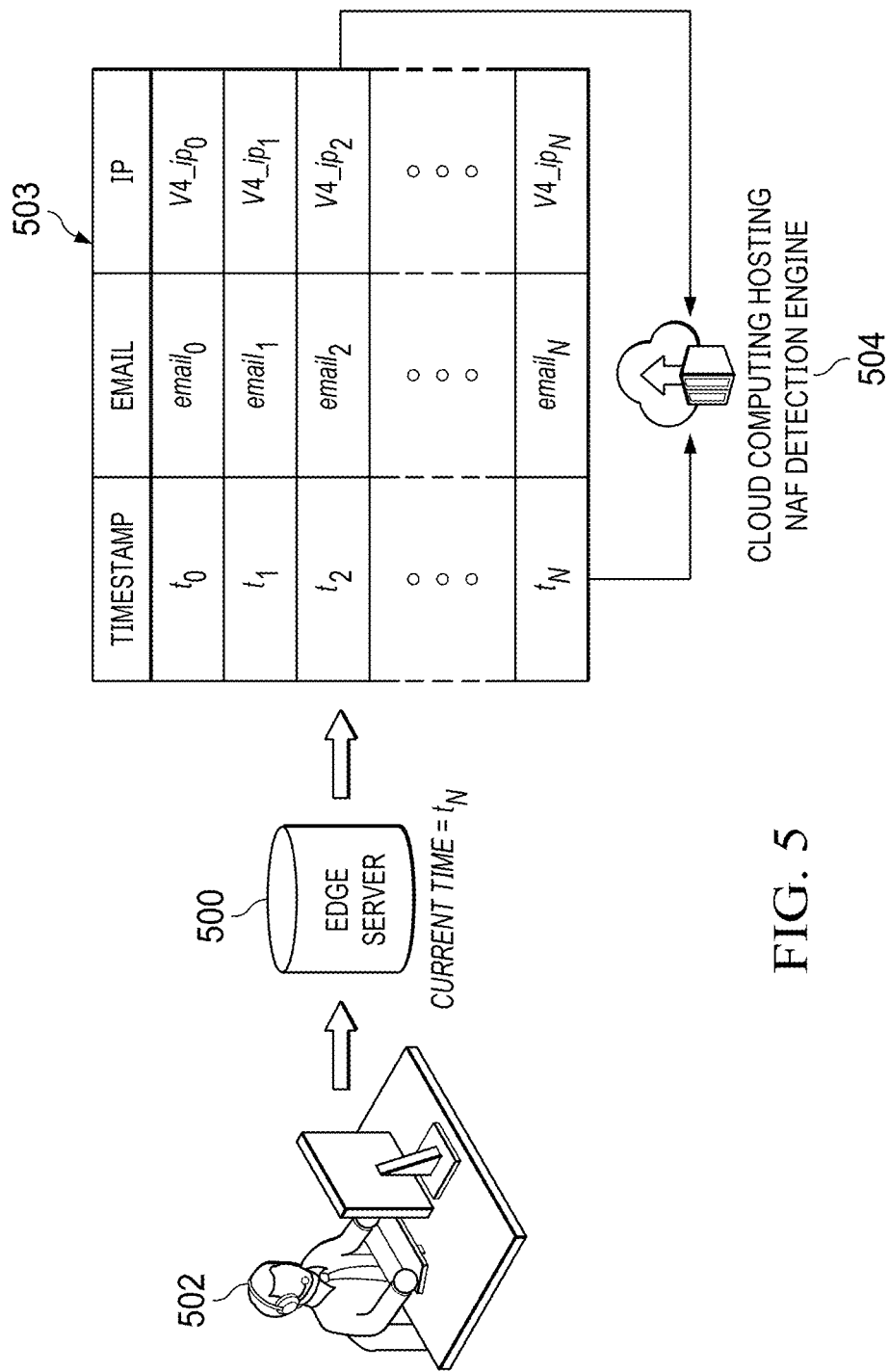
FIG. 5 depicts a technique for real-time detection of NAF activity, e.g., in the context of a CDN edge server.

Detection and Prevention of Account Fraud Cliques Using Graph-Based Neural Networks FIG. 5 depicts a technique for real-time detection of NAF activity in the context of a CDN edge server. The CDN edge server is configured as a machine such as shown in FIG. 2, and typically it forms part of the larger overlay network (although is not required). In this example scenario, the edge server 500 monitors any new account opening (e.g., from user 502), preferably in real-time. FIG. 5 depicts the online flow of log data 503 to be used for NAF detection. In this example, the data comprises a tuple {timestamp, email, IP address}. The real-time information is provided to the NAF detection engine 504, which may be hosted locally or in a cloud computing environment (or other CDN back-end system). Once a new account opening is triggered, the system reads it immediately and consequently can determine its status with respect to being benign/fraudulent by using the methodology described below. As depicted, the NAF detection engine may collect many signals that are associated with the registration process.

In a typical NAF scenario, a fraudster will often use a Virtual Private Network (VPN) to hide his or her real IP address, and he or she will also use a fake or stolen email address (or alternatively a disposable email service) for easily creating multiple accounts over a short time period. A time pattern of creations may indicate the use of a script to generate the account openings; as will be described below, the technique of this disclosure leverages this notion of time-distributed creations to identify whether a current query is part of a "clique" of similar activity being carried out by an attacker.

Figure 6:
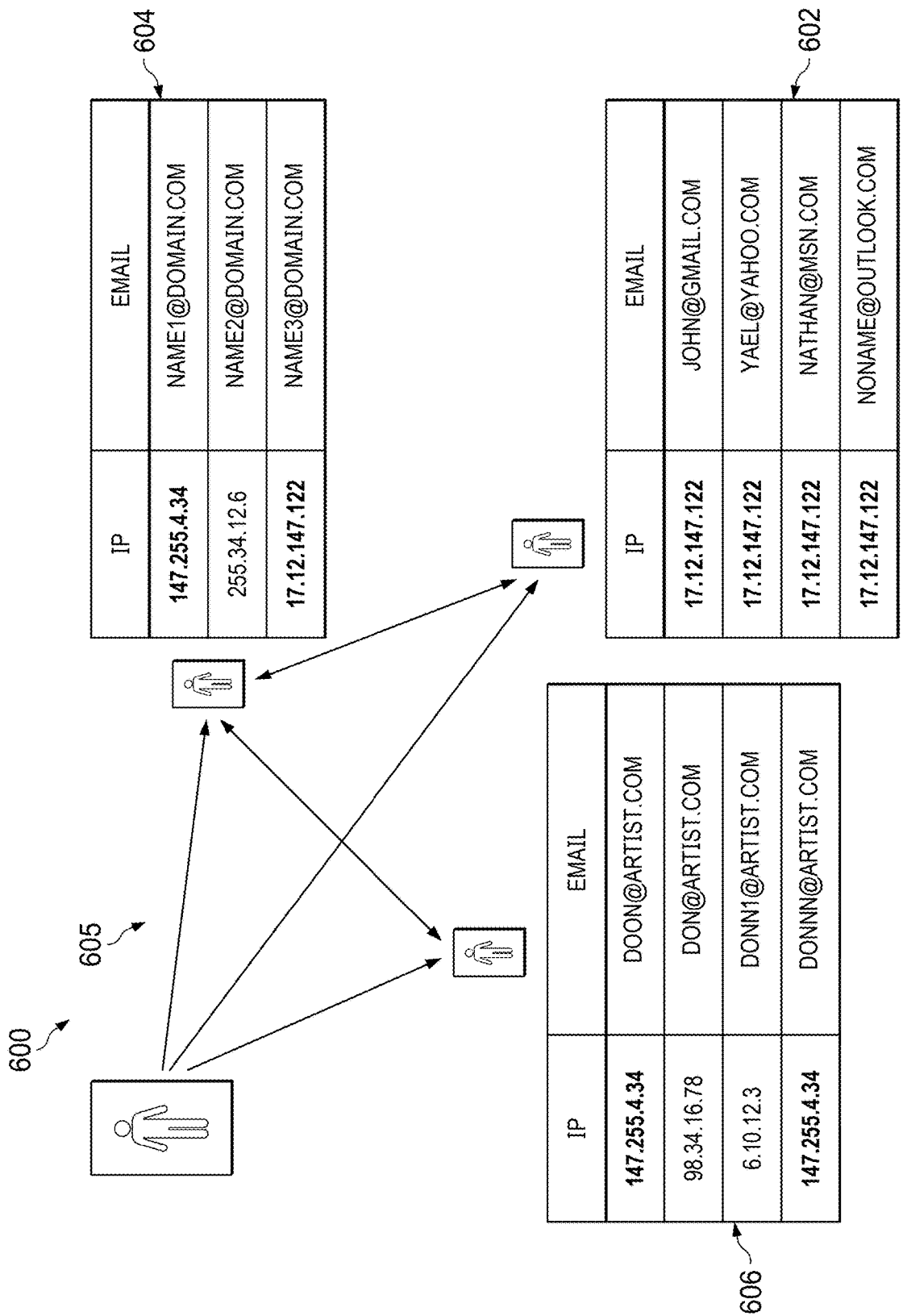
FIG. 6 depicts how a particular user identity may be decomposed into one or more aliases.

In particular, and as depicted in FIG. 6, a particular identity 600 may be decomposed into one or more aliases and, as described below, these aliases (as represented by graph 605) may be determined by the system to represent a "clique." For example, one type of alias (for the identity) may be identified by usage of a similar IP address for all registration logs (even with varied email addresses). This is table 602. Alternatively, other alias may be identified via high similarity among the email address prefixes used (even with varied IP addresses). Tables 604 and 606 represent these types of aliases. As depicted, edges in the graph 605 represents possible connection(s) of the various aliases aggregated under the real single identity 600. According to an aspect of this disclosure, when the system determines that these aliases have sufficient similarity to one another during a particular time period of interest (preferably as measured by a number of recent logins to the system), a NAF may then be indicated.

Generalizing, and based on logs labeled as NAFs, this type of fraud tends to be generated in groups with random or normalized time patterns. In other words, the fraudster is motivated to open several fake accounts via use of a bot (where time may be regulated), or perhaps manually, in the latter case resulting in a sparser number of new accounts with random creation times. In accordance with representative observed data patterns, the following represents a hypothesis for NAF structure that is exploited by the technique of this disclosure: benign users open a single account and do not show an abuse in that respect; real identity fraudsters are often decomposed into several aliases; and each alias in the data layer typically generates several accounts that have a signature that can be represented as a clique.

Figure 7:
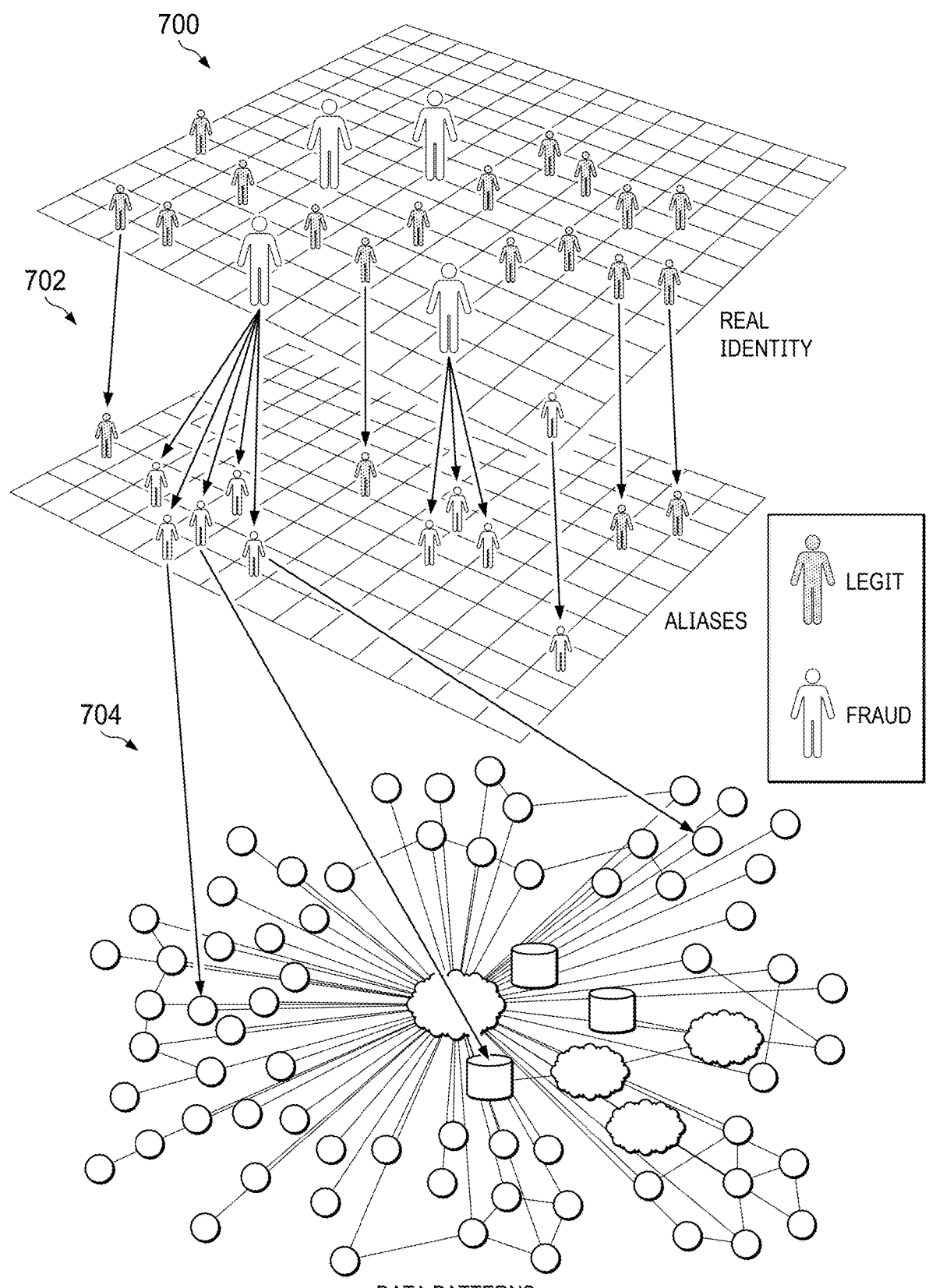
FIG. 7 depicts the technique of this disclosure, wherein the real identities of fraudsters as represented by one or more aliases are transformed into data patterns that form cliques in a graph of registration logs.

According to this approach, and with reference to FIG. 7, the real identities of fraudsters 700 as represented by one or more aliases 702 (so that their identity is obscured) are transformed into data patterns 704 that form cliques in the graph of the registration logs. To determine whether a particular query to the system (a new account open) has a probability of being fraudulent, the system utilizes a graph neural network (GNN).

Figure 8:
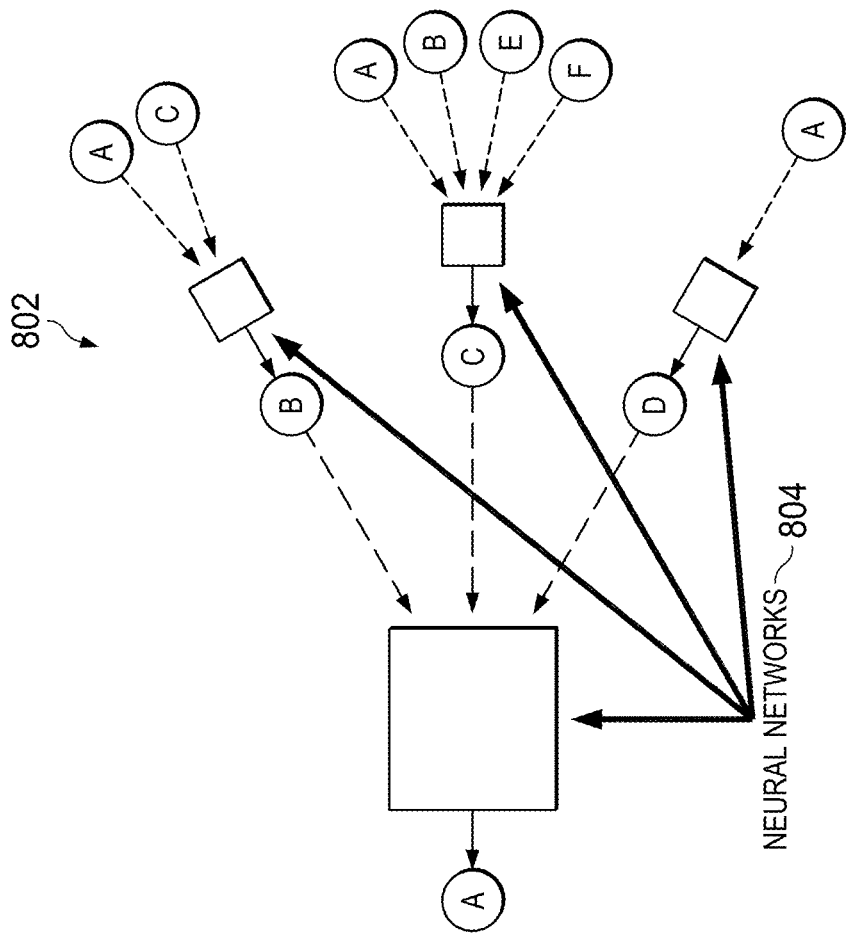
FIG. 8 depicts a graph neural network (GNN)
Figure 8:
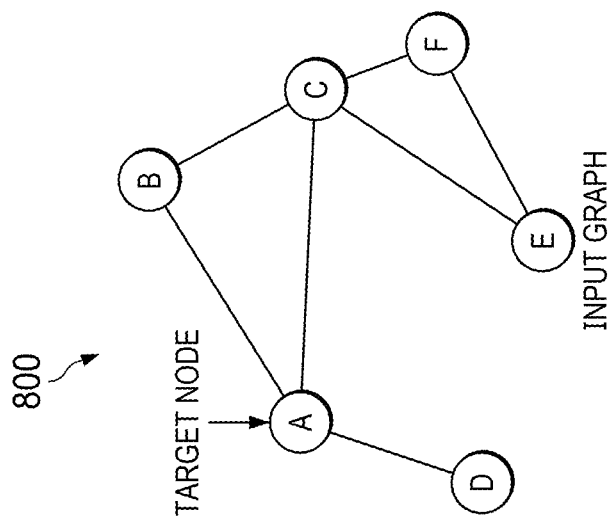

By way of further background, and as depicted in FIG. 8, in GNN modeling, the input data for the learning is a graph 800, and the GNN 802 can represent several depth of neighbors for the modeling. In particular, the GNN may comprise multiple neural networks 804 that perform different tasks including node classification and link predictions. GNN structures are advantageous for several reasons: they do not care about the order of the input, i.e., output results are not impacted by reordering of the input data; modeling is intuitive in that predictions typically are obtained by relying on neighbors' distributions; further, GNNs enable predictions on unseen graph structures. To support order invariance the neural networks 804 typically use some order-invariant aggregation operation, such as sum or mean. To achieve a better expressive capability of node influences, the performance of the GNN may be enhanced by using an attention mechanism to assign trainable weights to the nodes in aggregation. In neural networks, attention is a technique that mimics cognitive attention. The effect enhances some parts of the input data while diminishing other parts— thereby enabling the network to devote more focus to important part(s) of the data.

Figure 9:
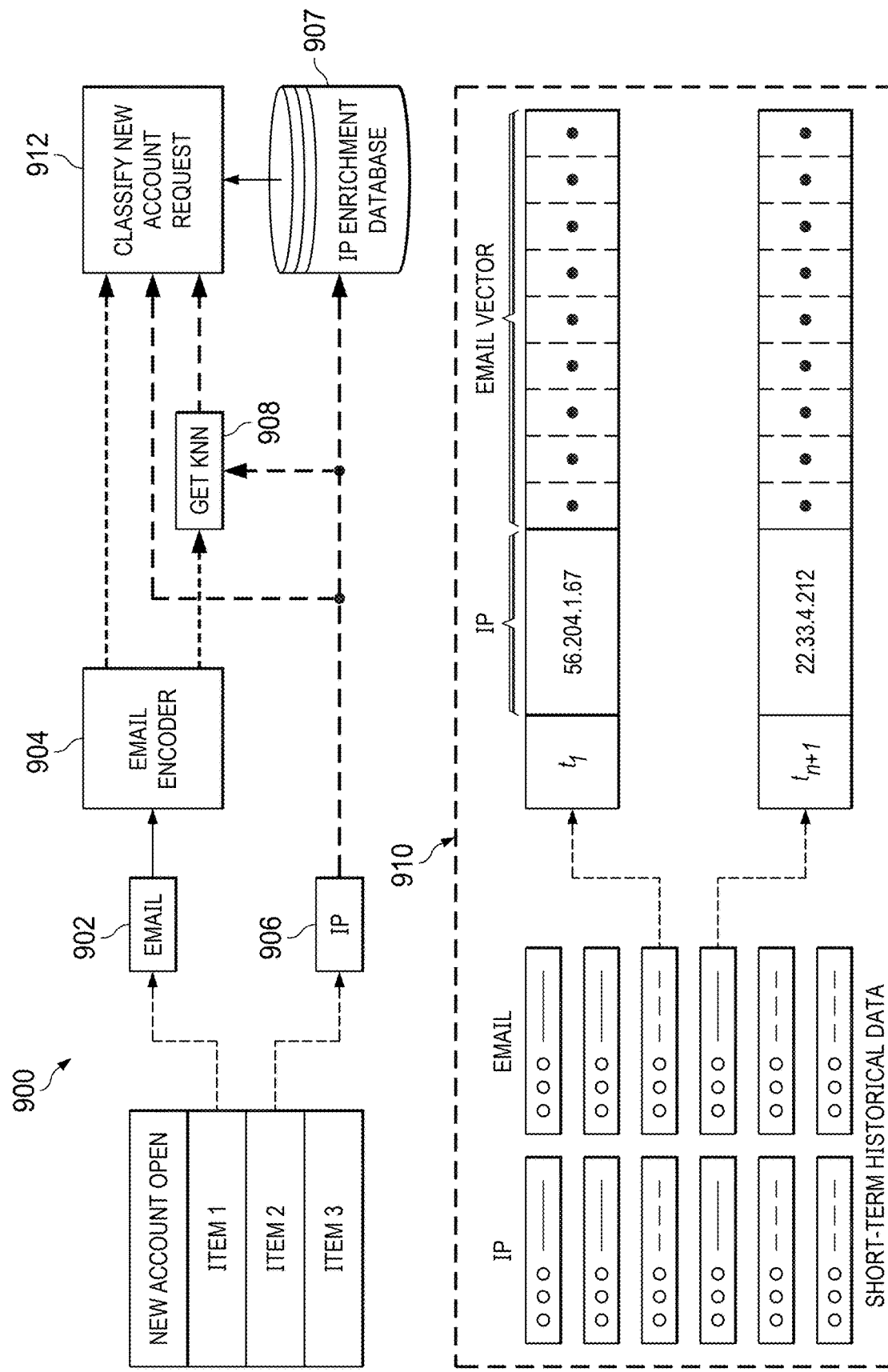
FIG. 9 depicts an embodiment of a computational pipeline of an NAF detection system according to this disclosure.

FIG. 9 depicts a preferred embodiment of a computational pipeline 900 of this disclosure operating to provide a prediction regarding whether a new account query represents a possible fraudulent account. The pipeline implements an attention-type GNN. As depicted, the computational pipeline comprises a first path 902 that includes an email encoder 904, and a second path 906 that encodes IP address data. The email encoder 904 is trained in advance on a corpus of training data, e.g., a set of emails that have been previously determined to be NAFs. A preferred approach is to implement the email encoder 904 using the encoder part of a trained encoder-decoder. The second path 906 may include an IP address enrichment database 907 that may be populated, e.g., via a fraud and risk scoring service. A service of this type performs real-time lookups to determine how risky a user, click, or transaction is based on an IP address and optional device information. In addition to analyzing if the IP address is a proxy or VPN, the API may also return one or more data points that are not necessarily or relevant here. It is not required that the IP address information be enriched, or that any particular service or additional signals be used.

Figure 10:
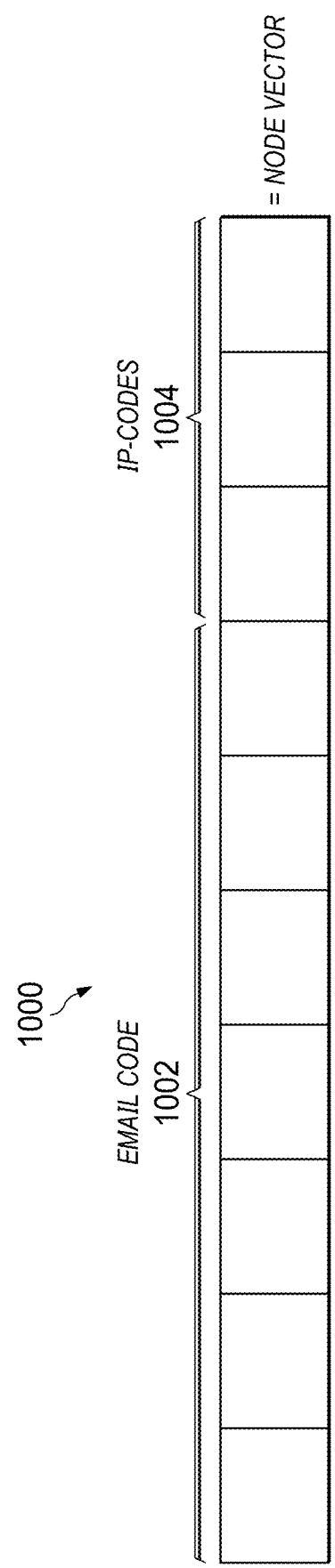
FIG. 10 depicts a representative node vector that is utilized in the computational pipeline depicted in FIG. 9.

As will be described, the first path outputs an encoded email, and the second path outputs an encoded IP address. Preferably, these outputs are concatenated into a single vector, sometimes referred to herein as an encoded node vector. Thus, the high level operation of the computational pipeline begins by obtaining the raw data (IP address, email, timestamp) for the new account. This data is obtained by querying a "new account open" method. The email is encoded in the first path of the pipeline; the IP address is encoded in the second path, optionally to include the additional signaling described above. The resulting node vector 1000 is shown in FIG. 10 and comprises an email code 1002 concatenated with the IP code(s) 1004.

Referring back to FIG. 9, these separate email and IP address paths are supplied to a Get KNN (k-nearest neighbors) process 908. In this system, the process 908 accesses and retrieves relevant data from a short-term historical database 910, which holds a given set of most recent logins to the system. As described below, in a preferred embodiment the database 910 is configured as a recirculating in-memory data structure wherein older queries age-out of the database as new queries arrive. The data stored in the database is structured in the same manner as generated the encoded node vector. In other words, the individual registration entries in the database are also encoded node vectors. Preferably, the database is fixed in size and, as noted above, it includes a most recent set of encoded node vectors (from the most recent set of logins). According to this disclosure, and in response to receipt of a current query, the GET KNN process 908 accesses the database 910 and retrieves the "k" nearest neighbors to the encoded node vector representing the current query. The nature of the similarity metric that is used to determine the k-nearest neighbors may vary. In a typical example, a typical lookup returns 5-10 node vectors representing the k-nearest neighbors, although this number is not a limitation.

After collecting the k-nearest neighbors to the query based on similarity, and as will be described below, the k-nearest neighbors are composited together with the query node itself as an "input" or "virtual" graph and then applied as input to a GNN classifier 912. GNN classifier is a graph neural network that has outputs a probability of fraud, typically as a score between 0 and 1. If the score exceeds a threshold, which threshold may be configurable, the current query is considered to be a NAF, with the query and its associated k-nearest neighbors (or at least some of them) deemed to be a fraud clique.

Each of the above-identified computational pipeline components is now described in additional detail.

Figure 11:
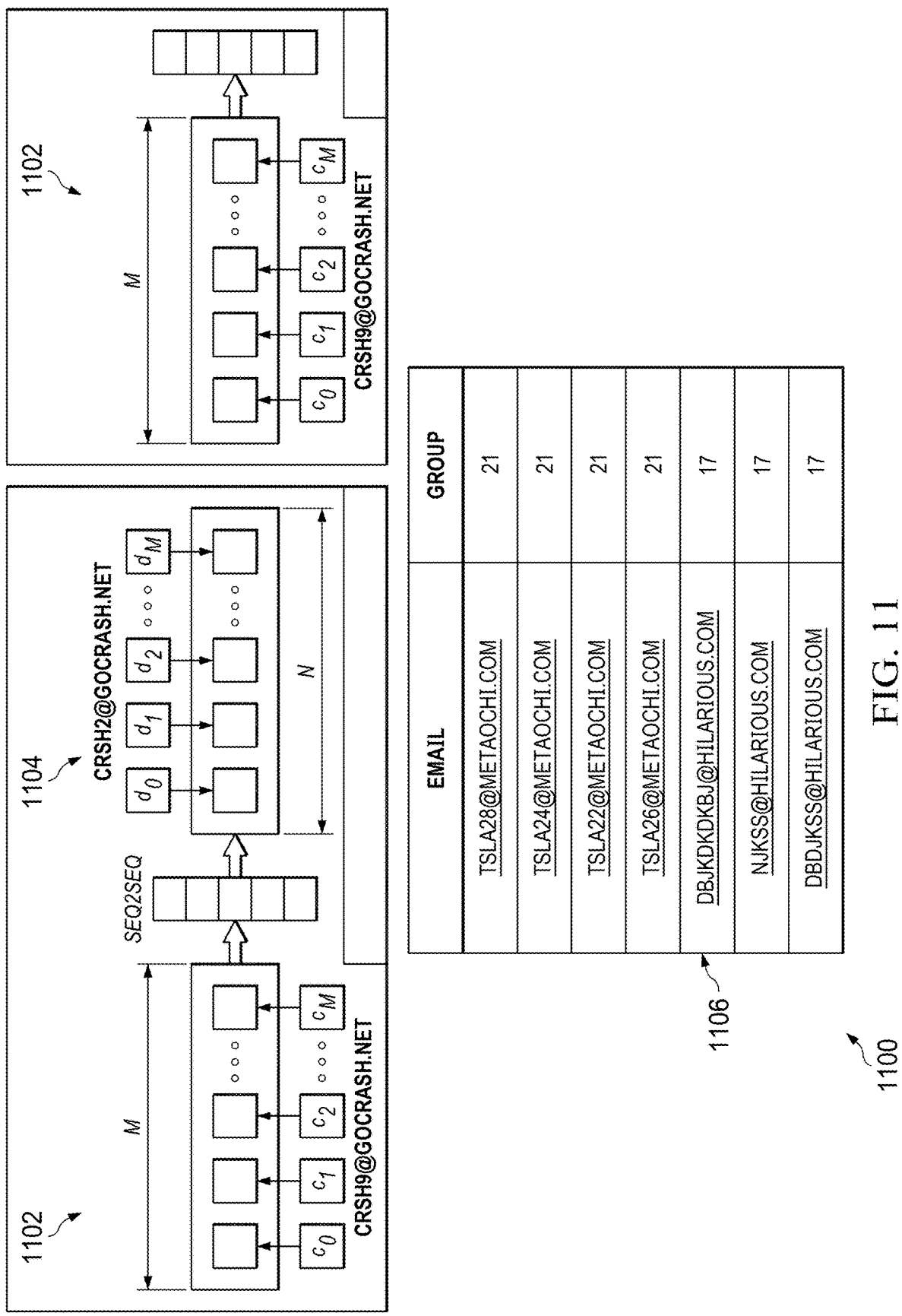
FIG. 11 depicts an email encoder of the computational pipeline.

FIG. 11 depicts the email encoder, which in a preferred embodiment is an RNN seq2seq encoder/decoder network 1100. The encoder decoder network is used for training, and the encoder portion thereof is used at prediction time. Tasks of sequence to sequence (seq2seq) learning can be done via recurrent neural network (RNN) architectures. A recurrent neural network (RNN) is a class of artificial neural networks where connections between nodes form a directed or undirected graph along a temporal sequence. This allows it to exhibit temporal dynamic behavior. As shown in FIG. 11, seq2seq encoder/decoder network 1100 comprises two RNNs, the encoder 1102, and the decoder 1104. In this embodiment, the encoder 1102 is of RNN-type. The encoder receives a variable-length sequence input (e.g., a domain or username pattern), and encodes it to a vector representing a summary of the sequence. The decoder predicts a target sequence based on this summary and previously predicted sequence items. As applied here, at training time preferably email variations from the same group are represented to the encoder-decoder. The table 1106 depicts a preferred technique, wherein a positive data set (i.e., confirmed frauds obtained from the logs) is used for the training. In this example, the identified emails have been relabeled with group indices, e.g., based on clear similarities in the email addresses. Once the email encoder 1102 is trained, the decoder portion 1104 is removed, and the trained encoder is integrated into the computational pipeline, e.g., via transfer learning, in this case, transfer by model. At prediction time, and as noted above, the latent representation is then used as the email code portion of the node vector (depicted in FIG. 10). As noted above, the email code is used in two phases of the algorithm. In particular, based on similarity criteria over vectors (that consider both email and IP jointly, as will be explained below), the Get KNN processes retrieves k-nearest neighbors of the query email (as evaluated together with the IP address information). Second, the encoded node vectors corresponding to the k-nearest neighbors are used as a part of the graph nodes of the virtual graph that is then input to the GNN classifier.

Similar to the case of email similarity and, as noted above, the IP address of the query new account also is used (by the Get KNN process) to collect k-NN data for the IP address of the query. For example, and considering an IPV4 scheme, one IP encoding scheme defines a similarity scheme based on the identity of the composing bytes of the IP address. Thus, for example, if the query is A.B.C.D and a reference is A.B.C.D, the similarity score=1.0; for a query A.B.C.D and a reference A.B.C.E, the similarity score=0.75, and so forth. Other similarity measures may be used. In this way, and after collecting the k-NN, the similarity value is used as a coding feature in the graph nodes. As a variant embodiment, other binary features per IP address (e.g., VPN=0/1) may be further appended to an encoding vector depicted in FIG. 10.

Summarizing, GetKNN is called just once per new account registration, and the method searches for neighbors based on both email and IP. Preferably, the method gives priority to logs with high IP similarity.

In a variant embodiment, the particular coding function applied to either the email address or the IP address of the query may vary. For example, the coding applied to the IP address may be a simple function that passes the actual IP address itself through without change.

Figure 12:
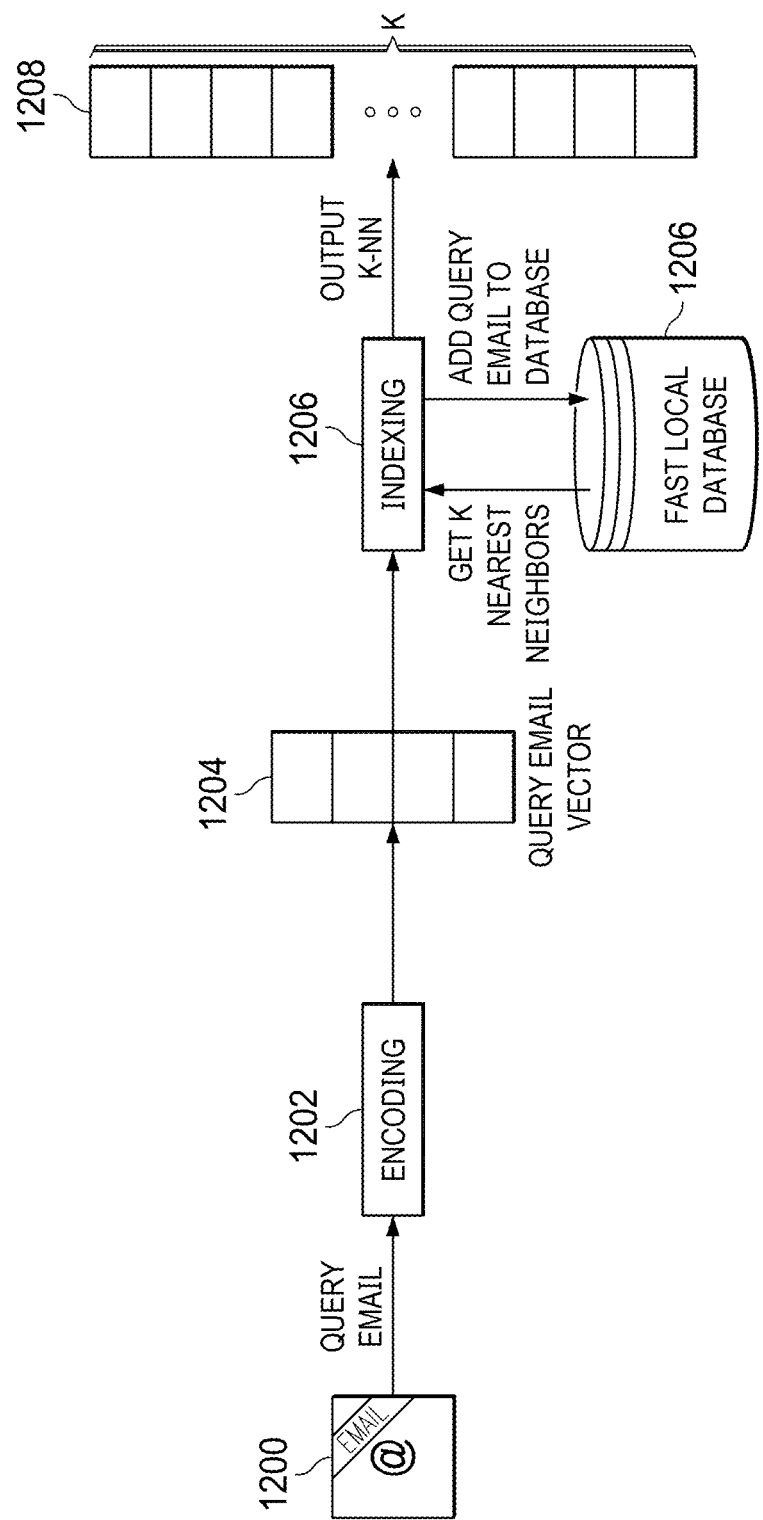
FIG. 12 depicts an embodiment of the Get KNN process of the computational pipeline.

FIG. 12 depicts a representative approach to retrieve the k-NN of a query from past logins. When a new account open 1200 occurs, and as has been described, the query is encoded by encoder 1202, generating a query vector 1204. The query vector 1204 is applied to an indexing process 1206 that adds the query vector 1204 to a fast local database 1206. Database 1206 corresponds to the in-memory recirculating data structure of the most recent set of registrations to the system. The lookup to the database 1206 returns the k nearest neighbors 1208, which together with the query node vector itself are then composited into the virtual graph as the input to the GNN classifier.

Figure 13:
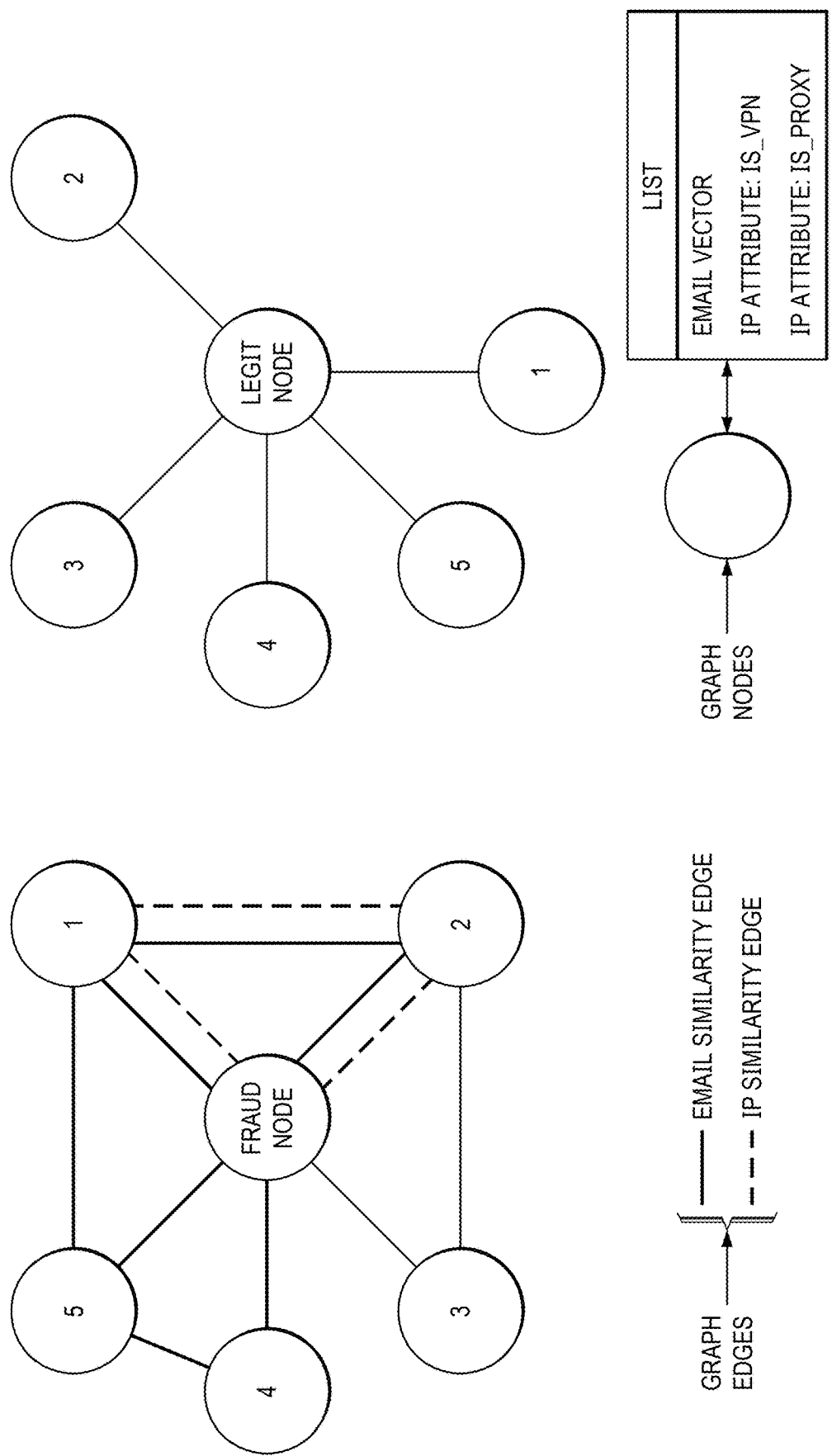
FIG. 13 depicts an operation of the GNN classifier to detect a NAF associated with new account open operation.

The GNN classifier works as depicted in FIG. 13. The example on the left side shows a query node 1300 surrounded by five nodes determined to be its k-NNs. In this example, and as indicated by the dashed lines, nodes 1, 2, 4 and 5 exhibit similarity to the email of query node, as do the email addresses represented by the node pairs 1 and 2, and 4 and 5. In addition, nodes 1 and 2 have IP addresses that are similar to that of the query node, and nodes 1 and 2 also share similar IP addresses with each other. The resulting virtual graph (as depicted) thus is highly likely to be classified by the GNN as representing an NAF. On the other hand, and on the right side, query node 1302 is surrounded by five nodes determined to be its k-NNs but, in this case, each of the nodes still exhibits sufficient dissimilarity (either with respect to email address or IP address). As such, the resulting virtual graph (again as depicted)—when applied to the GNN—is likely to be classified as representing a query that is legitimate (i.e., not an NAF). In practice, the prediction is related only for the query node (based on itself and the associated k-NN), with node classification being done via the GNN.

Generalizing, according to this disclosure a virtual graph is built by compositing into a virtual graph a set of node vector data representing a query node vector and its k-nearest neighbors pulled from a set of most recent registrations, and then applying that virtual graph to a GNN classifier. As previously noted, the GNN receives the virtual graph as its input and upon which the task of node classification occurs. For each query node, the virtual graph is built (by accessing the fast lookup database), and the build of the local graph takes place after collecting the k-NN. As previously described, preferably the email representation is combined with the IP address as the encoded node vector that is used as the lookup for the k-nearest neighbors. As depicted in the two examples in FIG. 13, classification relies on the distribution of the neighbor nodes in comparison with the query node; typically, the prediction correlates to a level of tightness of the connections among the query points and its neighbors. In particular, it is expected that the classification prediction correlates with the level of similarity between the query point and the corresponding collected neighbors. This approach ensures that fraud is predicted only in cases where true fraud cliques exist. As noted above, the ability to identify cliques may be based on IP similarities and/or similar email signatures; by using node vectors that include both (IP and email data), the computational scheme identifies cliques with either (or both) of these degrees of freedom.

Figure 14:
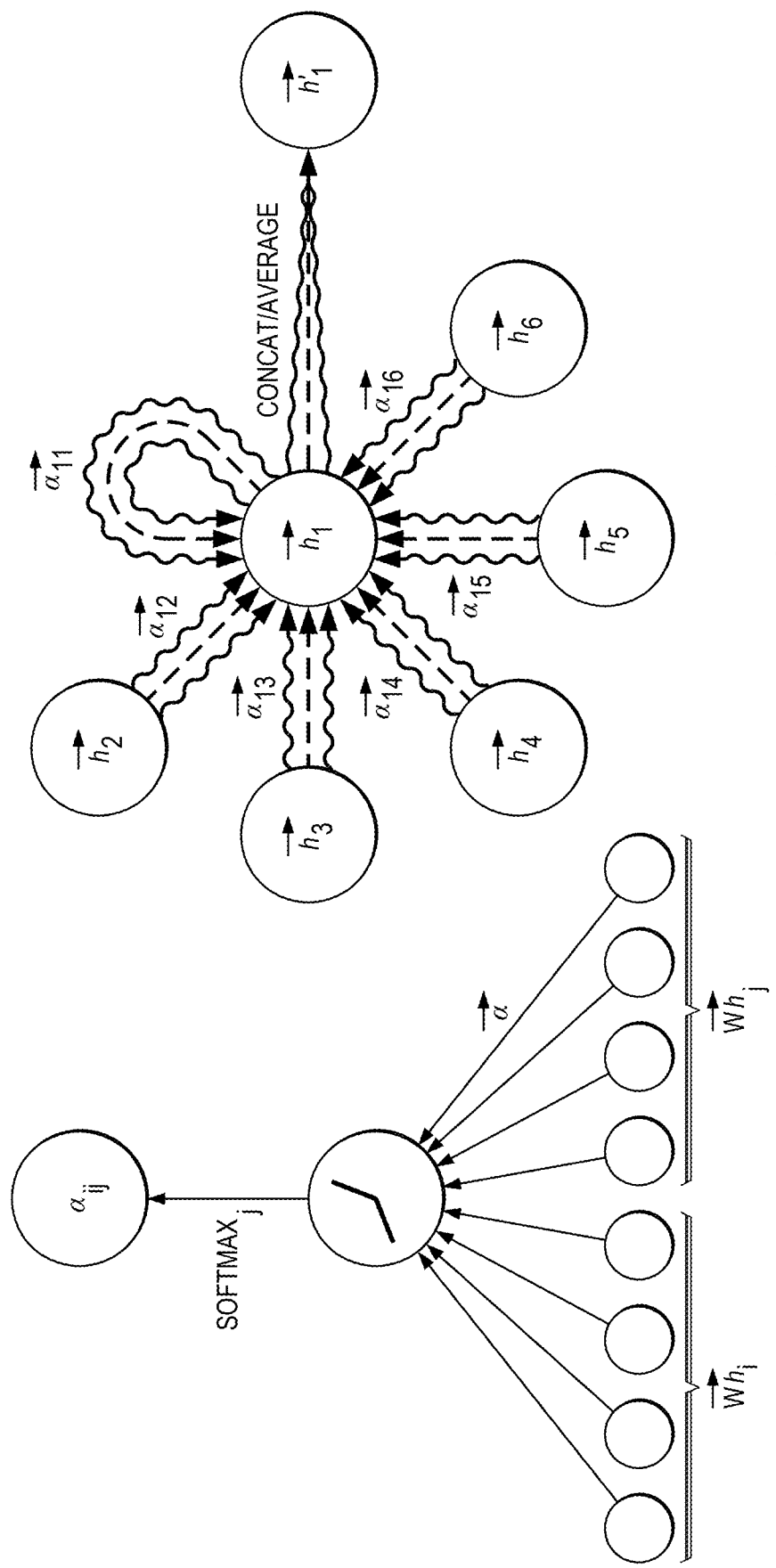
FIG. 14 depicts an attention mechanism that is utilized in the GNN classifier in a preferred embodiment.

FIG. 14 depicts a representative architecture for the GNN; note that this view does not show the modification of including IP similarity to edges. As noted, a preferred approach herein is based on augmenting the GNN with an attention mechanism. This technique is described in "Graph Attention Networks," ICLR 2018, to Velickovic et al. The paper describes an attention-based architecture that performs node classification of graph-structured data. The technique computes hidden representations of each node in the graph, by attending over its neighbors, following a self-attention strategy. This technique generates a so-called Graph Attention Network (GAT). The aggregation process of a multi-head graph attentional layer is illustrated by the right side in FIG. 14.

More formally, the left side of FIG. 14 represents an attention mechanism $\alpha(W\vec{h}_i, W\vec{h}_j)$ that is parameterized by a weight vector $\vec{a} \in \mathbb{R}^{2F'}$ applying an activation function. The right side in FIG. 14 is an illustration of multi-head attention (with three heads) by node 1 on its neighborhood. In this context of this disclosure, the various nodes surrounding the query node 1400 here represent the k-nearest neighbors identified from the in-memory data store of the most recent registrations. The different arrow styles denote independent attention computations. The aggregated feature from each head are concatenated (averaged) to obtain $\vec{h}_1'$.

In particular, the following describes the basic processing using a attention mechanism comprising a single-layer feed-forward neural network. In this example, the single graph attention layer has an input that is a set of node features, h={$\vec{h}_1, \vec{h}_2, \ldots, \vec{h}_N$}, $\vec{h}_i \in \mathbb{R}^F$, where N is the number of nodes, and F is a number of features in each node. The layer produces, as output, node features: h'={$\vec{h}_1', \vec{h}_2', \ldots, \vec{h}_N'$}, $\vec{h}_i' \in \mathbb{R}^{F'}$. The input features are transformed into higher-level features using a linear transformation parameterized by a weight matrix, $W \in \mathbb{R}^{F' \times F}$ applied to every node. A attention operation is then performed on the nodes by a shared attention mechanism $\alpha: \mathbb{R}^{F'} \times \mathbb{R}^{F'} \to \mathbb{R}$, which computes attention coefficients: $e_{ij} = \alpha(W\vec{h}_i, W\vec{h}_j)$ that indicate an importance of node j's features to node i. In a preferred approach, the attention coefficients are computed only in a neighborhood of node i in the graph. The attention scores are normalized across all choices of j using the softmax function:

$$\alpha_{ij} = \text{softmax}_j(e_{ij}) = \frac{\exp(e_{ij})}{\sum_{k \in N_i} \exp(e_{ik})}.$$

Once obtained, the attention coefficients are used to compute a linear combination of the features corresponding to them, to serve as the final output features for every node applying a nonlinearity, $\sigma$):

$$\vec{h}_i' = \sigma\left(\sum_{j \in N_i} \alpha_{ij} W\vec{h}_j\right)$$

After K independent attention mechanisms execute the above transformation, their features are then concatenated, resulting in the following output feature representation:

$$\vec{h}_i' = \|_{k=1}^K \sigma\left(\sum_{j \in N_i} \alpha_{ij}^k W^k \vec{h}_j\right)$$

wherein ∥ is a concatenation, $\alpha_{ij}^k$ are normalized attention coefficients computed by the $k^{th}$ attention mechanism $\alpha^k$, and $W^k$ is the corresponding input linear transformation's weight matrix. By employing averaging, the final node features are:

$$\vec{h}_i' = \sigma\left(\frac{1}{K}\sum_{k=1}^K \sum_{j \in N_i} \alpha_{ij}^k W^k \vec{h}_j\right)$$

To provide real-time predications, the computational pipeline retrieves the k-NN, calculates the summary vector, and applies the self-attention layer (with pooling) as the output layer to generate the required probability in favor of the new query. To enable real-time operation, and as described above, preferably a fixed size memory section (e.g., 910 in FIG. 9) is allocated. This fixed sized memory (e.g., RAM) stores a last seen number of registrations (typically on the order of several thousands). To maintain a fixed memory block, preferably cyclic shifts are implemented such that an oldest data point is deleted once a new sample arrives (as depicted in FIG. 12). In one example implementation, the RAM block is updated after a prediction on a new data point is taken. Further, preferably the RAM block is allocated on a per-tenant (overly network customer) basis such that the clique predictions are made in the right context.

The approach here provides for analysis and processing of email and associated IP address data by a Graph Neural Network (GNN) to provide a robust new account fraud detection and prevention mechanism. Typically, that mechanism acts as a front-end to some other security system or device, e.g., a system that protects resources (such as web sites or pages, web or other applications, etc.) from abuse.

As noted, the machine learning for the encoder-decoder is carried out in advance of prediction. The encoder-decoder typically is trained using emails that have been previously determined to represent NAF, although it is not required that these emails be associated with a particular overlay network customer/tenant. The GNN classifier is trained using the same paradigm of virtual graphs, which are predicted/created from the ordered logs (which is the training data). The training data is labeled with respect to status of fraud/benign. For prediction, a new query instance is first transformed into an input/virtual graph (in part using the pre-trained encoder/decoder) and then classified by the GNN based on similarities to recent requests.

Preferably, and as also described, the GNN uses, as an output layer, a self-attention layer (with pooling). An output of the self-attention layer is set for transforming a final node vector into a scalar score (0≤s≤1). By comparing the score to some threshold, which threshold may be configurable, the system characterizes the arbitrary new account open, typically as a binary (fraudulent/not fraudulent) output. Although not depicted, the score may be written to a log or otherwise directed to other computing systems have an interest therein. One such system is the account protection system shown in FIG. 4, but this is not a limitation. The back-end may comprise a policy management system, a STEM, a policy enforcement point (PEP), or any other type of computing system, machine, program, process, operating thread, and the like.

Typically, the machine learning is carried out in a compute cluster. Once the model is trained, it is instantiated in a detection process or machine as previously described.

The model may be re-trained with additional or updated training data.

Preferably, the threshold between a score representing a trustworthy and an untrustworthy new account open is configurable.

Preferably, when the new account open is determined by the GNN to be untrustworthy (worse than a threshold), no account is issued.

The may be further extended to detect inter-related attacks occurring (e.g., during a given time period) with respect to multiple fraud cliques.

When implemented in a CDN, configurations at the CDN edge may be used to coordinate collecting data to be used in initial data modeling, and to facilitate the detection and/or prevention operations based on that data.

The technique herein provides significant advantages The approach relies on predicted virtual graphs, and does not require identified graphs as inputs. As has been described, the approach relies on IP address and email signals jointly to detect cliques of similar new account registrations that are normally committed by fraudulent users.

The approach is reliable and scalable and operates in real-time with online computation demand, with detection occurring on a one (1) millisecond (ms) scale.

The techniques herein provide significant advantages. The approach provides for a deep learning network that utilizes a Graph Neural Network (GNN), preferably augmented with a self-attention output layer, for the classification task of detecting new account fraud and, in particular, whether a complete query log is part of a fraud clique. A security product or service that leverages the machine learning facilitates the detection and prevention of fraudulent activity in web applications through the abuse of the account registration process in the application. The deep learning approach of this disclosure addresses these issues by providing for real-time detection and prevention of new account opening fraud in online retail businesses. As noted above, when a new account is created, a few signals of the registration become available on the fly. These often include the registrant's email address, the IP address of registration and also the chosen username and password. The described provides a system that, based on these raw signals, learns to deliver a probability for the registration being fraudulent. More specifically, the approach herein jointly analyzes the email address and IP address to detect patterns of registrations that are normally committed by fraudulent users.

Although not intended to be limiting, the detection is performed with low latency, reliably and at large scale.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel®-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Other types of machine learning may be used to augment or to facilitate the building of the email and IP address computational branches as described herein.

What we claim is as follows:

1. A method of protecting an online system, comprising:
receiving data associated with a new account registration, the data comprising an email, and an associated Internet Protocol (IP) address;
applying an encoding to the data to generate an encoded node vector;
using the encoded node vector to collect a data set from a database of encoded node vectors representing a set of most recent account registrations;
constructing a virtual graph from the data set;
feeding the virtual graph to a Graph Neural Network (GNN) to generate a probability that the new account registration is fraudulent; and
responsive to a determination that the new account registration is fraudulent, taking a mitigation action to protect the online system.

2. The method as described in claim 1 wherein the GNN includes a self-attention output layer.

3. The method as described in claim 1 wherein the data set comprises the encoded node vector and its-k-nearest neighbor encoded node vectors associated with the encoded node vector.

4. The method as described in claim 1 wherein the email is encoded by applying the email to a recursive neural network (RNN), the recursive neural network having been pre-trained on a corpus of registrations that have been determined to be fraudulent.

5. The method as described in claim 4 wherein the recursive neural network is an encoder.

6. The method as described in claim 1 wherein the IP address is encoded according to a similarity scheme based on an identity of IP address bytes.

7. The method as described in claim 6 further including augmenting an IP address encoding with additional information associated with the IP address.

8. The method as described in claim 1 wherein the new account registration is associated with an attempt by a user to register a new account for a web site or application.

9. The method as described in claim 8 wherein the mitigation action rejects the new account registration.

10. The method as described in claim 1 wherein the determination occurs in real-time.

11. The method as described in claim 1 wherein the database of encoded node vectors is fixed in size and updated continuously as new account registrations are received.

12. An apparatus for real-time protection of an online system, comprising:
one or more hardware processors; and
computer memory holding computer program code executed by the one or more hardware processors and configured to:
receive data associated with a new account registration, the data comprising an email, and an associated Internet Protocol (IP) address;
apply an encoding to the data to generate an encoded node vector;
use the encoded node vector to collect a data set from a database of encoded node vectors representing a set of most recent account registrations;
construct a virtual graph from the data set;
feed the virtual graph to a Graph Neural Network (GNN) to generate a probability that the new account registration is fraudulent; and
responsive to a determination that the new account registration is fraudulent, take a mitigation action to protect the online system.

13. The apparatus as described in claim 12 wherein the GNN includes a self-attention output layer.

14. The apparatus as described in claim 12 wherein the data set comprises the encoded node vector and its-k-nearest neighbor encoded node vectors associated with the encoded node vector.

15. The apparatus as described in claim 12 wherein the computer program code configured to apply the encoding to the email is a recursive neural network (RNN), the recursive neural network having been pre-trained on a corpus of registrations that have been determined to be fraudulent.

16. The apparatus as described in claim 15 wherein the recursive neural network is an encoder.

17. The apparatus as described in claim 12 wherein the computer program code configured to apply the encoding to the IP address is a similarity encoder that is based on an identity of IP address bytes.

18. The apparatus as described in claim 12 wherein the computer memory comprises a fixed size random access memory (RAM) block that stores a fixed number of most recent account registrations.

19. The apparatus as described in claim 18 wherein the computer program code is further configured to execute cyclic shifts on the RAM block to maintain a most recent history of account registrations as account registration requests are being received.

20. The apparatus as described in claim 12 wherein the computer program code rejects the new account registration as the mitigation action.

* * * * *